United States Patent
Abraham (10) Patent No.: US 10,044,123 B2
(45) Date of Patent: Aug. 7, 2018

(54) BACKPLANE CONTROLLER MODULE USING SMALL OUTLINE DUAL IN-LINE MEMORY MODULE (SODIMM) CONNECTOR

(71) Applicant: American Megatrends, Inc., Norcross, GA (US)

(72) Inventor: Shibu Abraham, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 136 days.

(21) Appl. No.: 15/244,628

(22) Filed: Aug. 23, 2016

(65) Prior Publication Data

US 2018/0062293 A1 Mar. 1, 2018

(51) Int. Cl.
| | |
|---|---|
| *G06F 13/00* | (2006.01) |
| *H01R 12/73* | (2011.01) |
| *G06F 13/40* | (2006.01) |
| *G06F 13/42* | (2006.01) |
| *G06F 13/16* | (2006.01) |
| *H01R 13/627* | (2006.01) |
| *H01R 24/62* | (2011.01) |
| *H01R 107/00* | (2006.01) |

(52) U.S. Cl.
CPC ....... *H01R 12/737* (2013.01); *G06F 13/1668* (2013.01); *G06F 13/4068* (2013.01); *G06F 13/4282* (2013.01); *H01R 13/6273* (2013.01); *H01R 24/62* (2013.01); *G06F 2213/0028* (2013.01); *G06F 2213/0032* (2013.01); *G06F 2213/0042* (2013.01); *H01R 2107/00* (2013.01)

(58) Field of Classification Search
CPC .. H01R 12/737; H01R 24/62; H01R 13/6273; H01R 2107/00; G06F 13/4282; G06F 13/1668; G06F 13/4068; G06F 2213/0028; G06F 2213/0042; G06F 2213/0032
See application file for complete search history.

(56) References Cited

U.S. PATENT DOCUMENTS

| | | | | |
|---|---|---|---|---|
| 6,772,261 | B1* | 8/2004 | D'Antonio | G11C 29/48 365/63 |
| 8,364,833 | B2* | 1/2013 | Bennett | H04L 63/0245 370/465 |
| 9,870,333 | B1* | 1/2018 | Lam | G06F 13/4068 |

(Continued)

*Primary Examiner* — Jing-Yih Shyu
(74) *Attorney, Agent, or Firm* — Locke Lord LLP; Tim Tingkang Xia, Esq.

(57) ABSTRACT

A backplane system, which includes a backplane board and a backplane controller module having a backplane controller. The backplane controller module is configured to be detachably connected to the backplane board via a small outline dual in-line memory module (SODIMM) connector interface to enable communications between the backplane controller and the backplane board via the SODIMM connector interface, such that the backplane controller is configured to control a plurality of components on the backplane board. Specifically, the SODIMM connector interface may include a SODIMM connector socket disposed on the backplane board, and a SODIMM connector pin set provided on the backplane controller module to be detachably inserted into the SODIMM connector socket. The SODIMM connector pin set may be a 144-pin SODIMM connector having 144 contact pins.

17 Claims, 4 Drawing Sheets (56) References Cited

U.S. PATENT DOCUMENTS

| | | | |
|---|---|---|---|
| 2009/0076628 A1* | 3/2009 | Smith | G05B 19/4184 |
| | | | 700/3 |
| 2015/0181746 A1* | 6/2015 | Mullen | G06F 1/183 |
| | | | 361/679.31 |
| 2015/0242355 A1* | 8/2015 | Dhandapani | G06F 13/102 |
| | | | 710/13 |
| 2015/0254205 A1* | 9/2015 | Chu | G06F 13/4022 |
| | | | 710/308 |
| 2016/0073544 A1* | 3/2016 | Heyd | G11B 33/128 |
| | | | 361/679.31 |
| 2017/0147042 A1* | 5/2017 | Liu | G06F 1/187 |

* cited by examiner

BACKPLANE CONTROLLER MODULE USING SMALL OUTLINE DUAL IN-LINE MEMORY MODULE (SODIMM) CONNECTOR

FIELD

The present disclosure relates generally to backplane technology, and particularly to system and methods to connect a backplane to a backplane controller module using a small outline dual in-line memory module (SODIMM) connector interface.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A backplane system requires a backplane controller on the backplane to control the operation of the backplane. Typically, the backplane controller is a computer chip, which may be provided on the backplane. However, different backplane controller chips may provide different functions. If a backplane controller chip on a backplane does not support certain features or functions, it may be difficult for a user of a backplane to change the backplane controller on the backplane in order to obtain the additional features or functions not supported by the current backplane controller.

Therefore, an unaddressed need exists in the art to address the aforementioned deficiencies and inadequacies.

SUMMARY

Certain aspects of the present disclosure direct to a backplane system, which includes a backplane board; and a backplane controller module having a backplane controller. The backplane controller module is configured to be detachably connected to the backplane board via a small outline dual in-line memory module (SODIMM) connector interface to enable communications between the backplane controller and the backplane board via the SODIMM connector interface, such that the backplane controller is configured to control a plurality of components on the backplane board.

In certain embodiments, the SODIMM connector interface includes: a SODIMM connector socket disposed on the backplane board; and a SODIMM connector pin set provided on the backplane controller module, configured to be detachably inserted into the SODIMM connector socket.

In certain embodiments, the SODIMM connector pin set is a 144-pin SODIMM connector having 144 contact pins, and the SODIMM connector socket is a corresponding 144-pin SODIMM socket.

In certain embodiments, the 144 contact pins of the SODIMM connector pin set include: backplane controller host related pins; reset and programming pins; configuration and strapping pins; and miscellaneous and reserved pins.

In certain embodiments, the components on the backplane board include a plurality of storage drives, and the 144 contact pins of the SODIMM connector pin set further include drive presence and activity detect pins.

In certain embodiments, the components on the backplane board include a plurality of light emitting diodes (LEDs), and the 144 contact pins of the SODIMM connector pin set further include LED control pins.

In certain embodiments, the components on the backplane board include at least one power connector, and the 144 contact pins of the SODIMM connector pin set further include power and ground pins.

In certain embodiments, the components on the backplane board include at least one universal serial bus (USB) connector, and the 144 contact pins of the SODIMM connector pin set further include USB pins.

In certain embodiments, the components on the backplane board include at least one latch, and the 144 contact pins of the SODIMM connector pin set further include latch pins.

In certain embodiments, the 144 contact pins of the SODIMM connector pin set further include baseboard management controller (BMC) or firmware upgrade controller pins.

In certain embodiments, the backplane board is a serial attached SCSI (SAS) or serial AT attachment (SATA) backplane board.

Certain aspects of the present disclosure direct to a backplane controller module, which includes a backplane controller; and a SODIMM connector pin set, configured to be detachably inserted into a SODIMM connector socket on a backplane board to enable a communication between the backplane controller and the backplane board, such that the backplane controller is configured to control a plurality of components on a backplane board.

In certain embodiments, the SODIMM connector pin set is a 144-pin SODIMM connector having 144 contact pins.

In certain embodiments, the components on the backplane board include: a plurality of storage drives; a plurality of LEDs; at least one power connector; at least one USB connector; and at least one latch.

In certain embodiments, the 144 contact pins of the SODIMM connector pin set include: backplane controller host related pins; power and ground pins; USB pins; reset and programming pins; configuration and strapping pins; LED control pins; drive presence and activity detect pins; BMC or firmware upgrade controller pins; latch pins; and miscellaneous and reserved pins.

Certain aspects of the present disclosure direct to a backplane board, which includes: a SODIMM connector socket disposed on the backplane board, allowing a backplane controller module having a corresponding SODIMM connector pin set to be detachably inserted into the SODIMM connector socket to enable a communication between a backplane controller on the backplane controller module and the backplane board; and a plurality of components provided thereon, each configured to be controlled by the backplane controller.

In certain embodiments, the SODIMM connector socket is a 144-pin SODIMM socket, and the corresponding SODIMM connector pin set has 144 contact pins.

In certain embodiments, the components include: a plurality of storage drives; a plurality of LEDs; at least one power connector; at least one USB connector; and at least one latch.

In certain embodiments, the 144 contact pins of the SODIMM connector pin set include: backplane controller host related pins; power and ground pins; USB pins; reset and programming pins; configuration and strapping pins; LED control pins; drive presence and activity detect pins; BMC or firmware upgrade controller pins; latch pins; and miscellaneous and reserved pins.

In certain embodiments, the backplane board is a SAS or SATA backplane board.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing may be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" may be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

As used herein, the term "header" generally refers to a pin header, which is a form of electrical connector that includes one or more rows of male pins. A distance between the pins of the header is commonly referred as the pitch, and the pitch of the header is typically 0.1 inch (2.54 mm), 0.05 inch (1.27 mm), or 2 mm.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

The systems and methods described herein may be implemented by one or more computer programs executed by one or more processors. The computer programs include processor-executable codes or instructions that are stored on a non-transitory tangible computer readable medium. The computer programs may also include stored data. Non-limiting examples of the non-transitory tangible computer readable medium are nonvolatile memory, magnetic storage, and optical storage.

As discussed above, different backplane controller chips may provide different functions. If a backplane controller chip on a backplane does not support certain features or functions, it may be difficult for a user of a backplane to change the backplane controller on the backplane in order to obtain the additional features or functions not supported by the current backplane controller. For example, the current backplane board may not match a new backplane controller chip that supports the additional features or functions desired, and a different backplane board with a different design may be needed to match with the new backplane controller chip. In this case, separate backplane boards with multiple designs may be needed to match each type of the backplane controller chips, which increases the cost of the backplane system.

To address such need, certain aspects of the present disclosure may be related to a system, which includes a backplane and a backplane controller module connected by a small outline dual in-line memory module (SODIMM) connector interface. SODIMM is a type of computer memory built using integrated circuits, and SODIMM connectors are typically used to attach single data rate (SDR) or double data rate (DDR) synchronous dynamic random access memory (SDRAM) modules to the memory socket in the notebook and other portable computers. Generally, the SODIMM connectors may carry memory related data, address and control signals. Thus, in this case, the backplane controller module may communicate with the backplane using the SODIMM connector interface, which is repurposed to carry backplane related signals. In certain embodiments, the backplane may be a serial attached SCSI (SAS) or serial AT attachment (SATA) backplane. The backplane has a SODIMM socket, and the backplane controller module may include a backplane controller chip and associated components mounted thereon, and the SODIMM interface that fits the SODIMM socket on the backplane. The signals of the backplane controller module may be routed to an SODIMM goldfinger, which are connected to the backplane through the SODIMM connector. In this case, a plurality of backplane controller modules can be made for different backplane controller chips with different functions, and the backplane board may adopt a modular design to match with all of the backplane controller modules. Thus, there is no need to provide separate backplane boards with multiple designs for all types of the backplane controller chips, and the cost and design time can be reduced.

Figure 1:
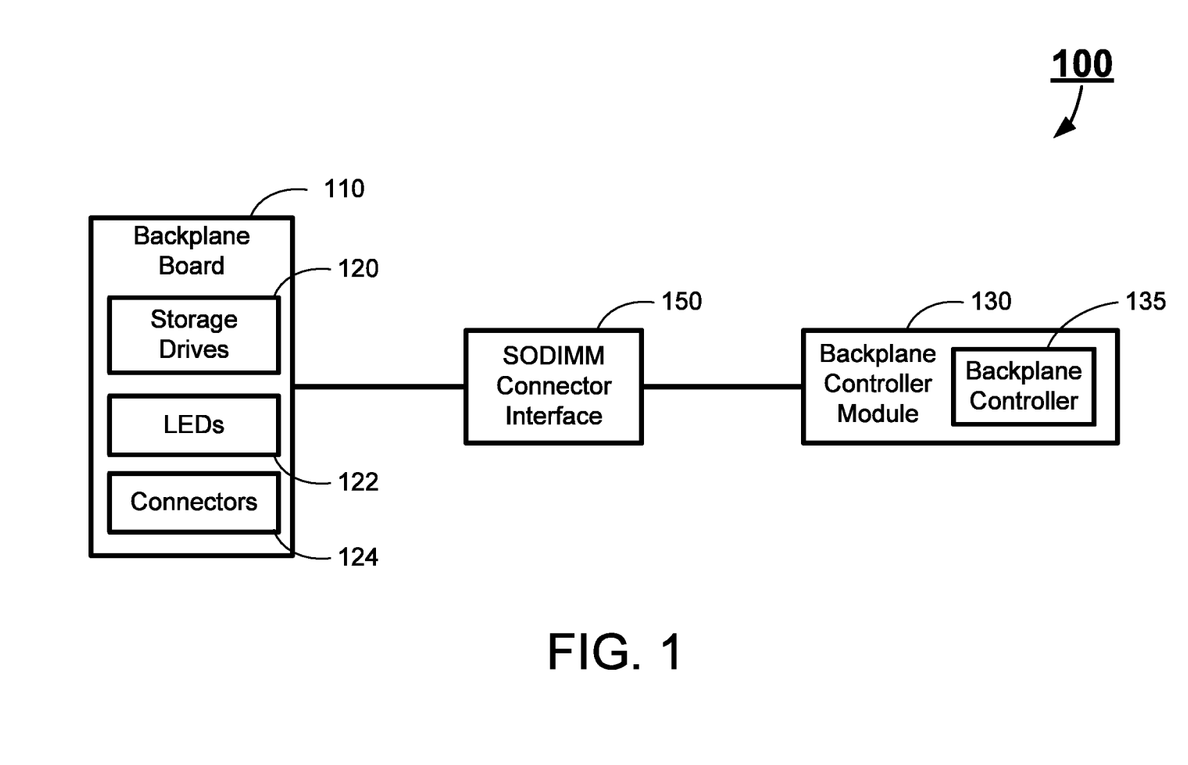
FIG. 1 schematically depicts a block diagram of a backplane system according to certain embodiments of the present disclosure.

In one aspect, the present disclosure relates to a backplane system. FIG. 1 shows a backplane system according to certain embodiments of the present disclosure. As shown in FIG. 1, the backplane system 100 includes a backplane board 110 and a backplane controller module 130. Further, a SODIMM connector interface 150 is provided, such that the backplane controller module 130 may be detachably connected to the backplane board 110 via the SODIMM connector interface 150 to enable communications between the backplane controller module 130 and the backplane board 110 via the SODIMM connector interface 150.

The backplane board 110 is a circuit board on which the components of the backplane system 100 may be provided. For example, as shown in FIG. 1, the components may include, without being limited thereto, storage drives 120, light emitting diodes (LEDs) 122, and connectors 124. Further, the backplane board 110 may include necessary hardware components and software components (not shown) to perform its corresponding tasks. Examples of these hardware and software components may include, but not limited to, circuit boards, required memory, interfaces, buses, Input/Output (I/O) modules, jumpers, headers, and chips storing necessary software data or code.

The backplane controller module 130 is a hardware module providing a backplane controller 135 for the backplane system 100. In certain embodiments, the backplane controller module 130 may be implemented as a circuit board, and the backplane controller 135 is a backplane controller chip formed on the circuit board. When the backplane controller module 130 is connected to the backplane board 110, the backplane controller 135 controls the components on the backplane board 110, such as the storage drives 120, the LEDs 122, the connectors 124, and other components of the backplane board 110.

The SODIMM connector interface 150 is an interface used for the communication between the backplane controller 135 and the backplane board 110. As discussed above, SODIMM connectors are typically used to attach SDR or DDR SDRAM modules to the memory socket in the notebook and other portable computers. In other words, the SODIMM connector interface 150 is generally used for memory related data transmission purposes. However, as shown in FIG. 1, the SODIMM connector interface 150 is provided in the backplane system 100 for the purpose of data transmission of backplane related signals between the backplane controller 135 and the backplane board 110.

Generally, the SODIMM connector interface 150 may include two parts: a SODIMM connector pin set, which includes multiple contact pins, and a corresponding SODIMM connector socket that allows the SODIMM connector pin set to be detachably inserted therein. In certain embodiments, the SODIMM connector pin set may be a 144-pin SODIMM connector having 144 contact pins and a single notch near the center, with one side of the notch having 60 contact pins and the other side of the notch having 84 contact pins. In this case, the SODIMM connector socket is a corresponding 144-pin SODIMM socket.

Figure 2A:
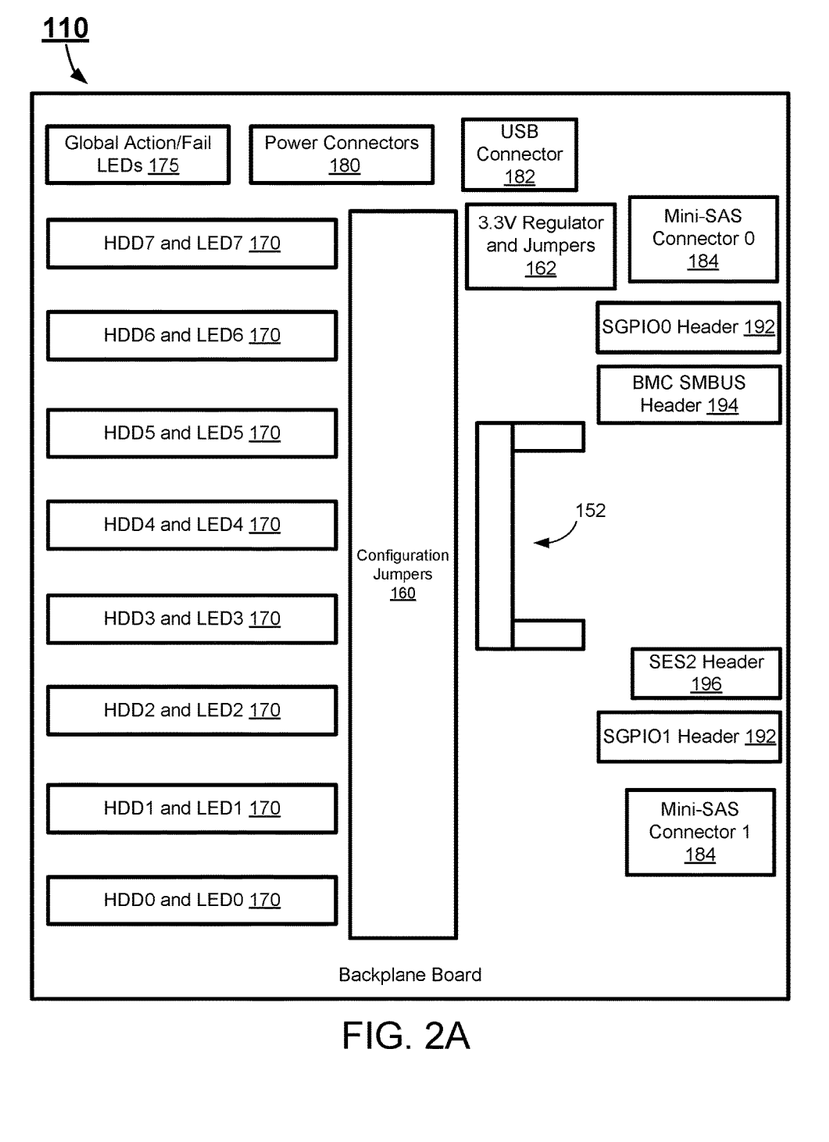
FIG. 2A schematically depicts a backplane board of the backplane system according to certain embodiments of the present disclosure.

FIG. 2A schematically depicts a backplane board of the backplane system according to certain embodiments of the present disclosure. As shown in FIG. 2A, the backplane board 110 may have a SODIMM connector socket 152 thereon, which is configured to match with a corresponding SODIMM connector pin set on the backplane controller module 130. In certain embodiments, the SODIMM connector socket 152 may be a 144-pin SODIMM socket. As shown in FIG. 2A, there is no component disposed on the backplane board 110 along the opening direction of the SODIMM connector socket 152, such that the backplane controller module 130 may be inserted to the SODIMM connector socket 152 without any interference with other components of the backplane board 110. The components provided on the backplane board 110, as shown in FIG. 2A, include without being limited thereto: a set of configuration jumpers 160, a 3.3V regulator and jumpers 162, a plurality of hard disk drives (HDDs) and corresponding LEDs 170 being numbered from 0 to 7, a set of global action/fail LEDs 175, a plurality of power connectors 180, and a USB connector 182. Moreover, other components provided on the backplane board 110 further include, a couple of mini-SAS connectors 184 being numbered as 0 and 1, a couple of SGPIO0 and SGPIO1 headers 192, a BMC SMBus header 194, and a SES2 header 196. Details of these connectors and headers are not hereinafter described. It should be particularly noted that the layout of the components on the backplane board 110 as shown in FIG. 2A is provided as an example, and is not intended to limit the actual layout of the components.

The HDDs and corresponding LEDs 170 are provided on the backplane board 110. As shown in FIG. 2A, a total of 8 HDDs and corresponding LEDs 170 are provided, each being numbered from 0 to 7. Specifically, the HDDs are provided in the backplane system 100 as a plurality of storage drives to form a data center with a large amount of storage space, and the corresponding LEDs are provided as indicators to show the status of the HDDs. In certain embodiments, each of the HDDs may have multiple corresponding LEDs to indicate different status of the HDD. In certain embodiments, each of the HDDs is connected to the backplane board 110 by being inserted in a corresponding drive slot on the backplane board 110. In certain embodiments, when some or all of the HDDs are provided, adjustment of the jumpers 160 and 162 may be required.

The set of global action/fail LEDs 175 are provided to indicate a global action or fail status of the backplane system. In certain embodiments, the set of global action/fail LEDs 175 may include multiple LEDs to indicate different global action or fail status.

The power connectors 180 are provided for powering up the components of the backplane system 100. In certain embodiments, the power of the backplane system 100 may be provided by a power supply unit (PSU), a battery, or a combination of both.

The USB connector 182 is an interface under the USB protocol. USB is an industry standard developed in the mid-1990s that defines the cables, connectors and communications protocols used in a bus for connection, communication, and power supply between computers and electronic devices. USB was designed to standardize the connection of computer peripherals (including keyboards, pointing devices, digital cameras, printers, portable media players, disk drives and network adapters) to personal computers, both to communicate and to supply electric power. Thus, the backplane board 110 may provide at least one USB connector 182 to enable USB connections.

Figure 2B:
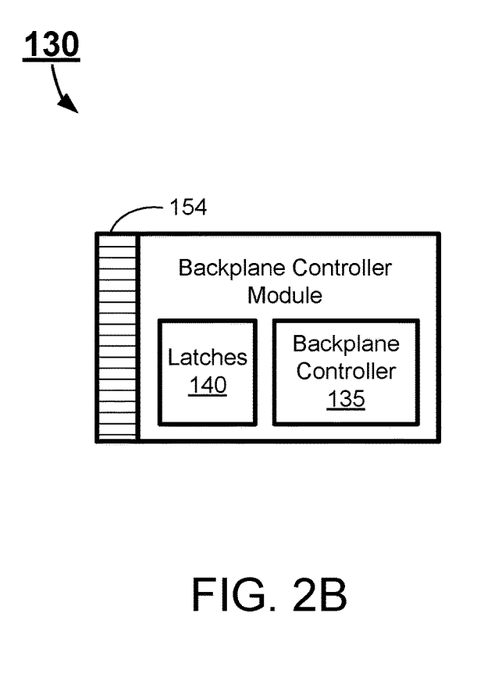
FIG. 2B schematically depicts a backplane controller module of the backplane system according to certain embodiments of the present disclosure.

FIG. 2B schematically depicts a backplane controller module of the backplane system according to certain embodiments of the present disclosure. As shown in FIG. 2B, the backplane controller module 130 may include a SODIMM connector pin set 154, which corresponds to the SODIMM connector socket 152 of the backplane board 110, such that the SODIMM connector pin set 154 may be detachably inserted to the SODIMM connector socket 152. In certain embodiments, the SODIMM connector pin set 154 may be a 144-pin SODIMM connector having 144 contact pins. Further, the components provided on the backplane controller module 130 include, without being limited thereto, a backplane controller 135 and a plurality of latches 140. Further, the backplane controller module 130 may include necessary hardware components and software components (not shown) to perform its corresponding tasks. Examples of these hardware and software components may include, but not limited to, required memory, interfaces, buses, Input/Output (I/O) modules, jumpers, headers, and chips storing necessary software data or code.

The backplane controller 135 is a backplane microcontroller chip formed on the backplane controller module 130 to perform control of the components of the backplane board 110 when the backplane controller module 130 is connected to the backplane board 110. In certain embodiments, the backplane controller 135 is configured to generate control signals for the components of the backplane board 110, and the control signals may be sent to the backplane board 110 via the SODIMM connector pin set 154. In certain embodiments, examples of the control signals may include, without being limited thereto, backplane controller host related signals; power and ground signals; USB control signals; reset and programming signals; configuration and strapping signals; LED control signals; drive presence and activity detect signals; BMC or firmware upgrade control signals; and latch signals. It should be particularly noted that different backplane controllers 135 may have their own specific features or functions, and the control signals being generated may be different.

Each of the latches 140 is a switch device or circuit that may be used to provide a combination of electrical connections between the components of the backplane board 110 and the backplane controller module 130. In certain embodiments, the latches 140 may be provided as a part of the components on the backplane board 110.

As discussed above, different backplane controllers may have their own specific features or functions, and the control signals being generated by different backplane controllers may be different. Thus, the contact pins of the SODIMM connector pin set 154 may be provided for different purposes based on the set of control signals being generated by the backplane controller 135 of the backplane controller module 130. In certain embodiments, for a 144-pin SODIMM connector pin set 154 having 144 contact pins, the contact pins may include certain pins for the typical backplane controller features or functions, such as the backplane controller host related pins for the backplane controller host related signals; the reset and programming pins for reset and programming signals; and the configuration and strapping pins for configuration and strapping signals. In certain embodiments, the contact pins may include drive presence and activity detect pins for the control signals for the storage drives, such as the HDDs. In certain embodiments, the contact pins may include LED control pins for the LED control signals. In certain embodiments, the contact pins may include power and ground pins for the power and ground signals. In certain embodiments, the contact pins may include USB pins for USB control signals. In certain embodiments, the contact pins may include latch pins for the latch signals. In certain embodiments, the contact pins may include BMC or firmware upgrade controller pins for BMC or firmware upgrade control signals. Moreover, in certain embodiments, the contact pins may include miscellaneous and reserved pins for all other potential features and functions that may be provided and configured by the Original Equipment Manufacturers (OEMs) of the backplane controller 135.

Figure 3:
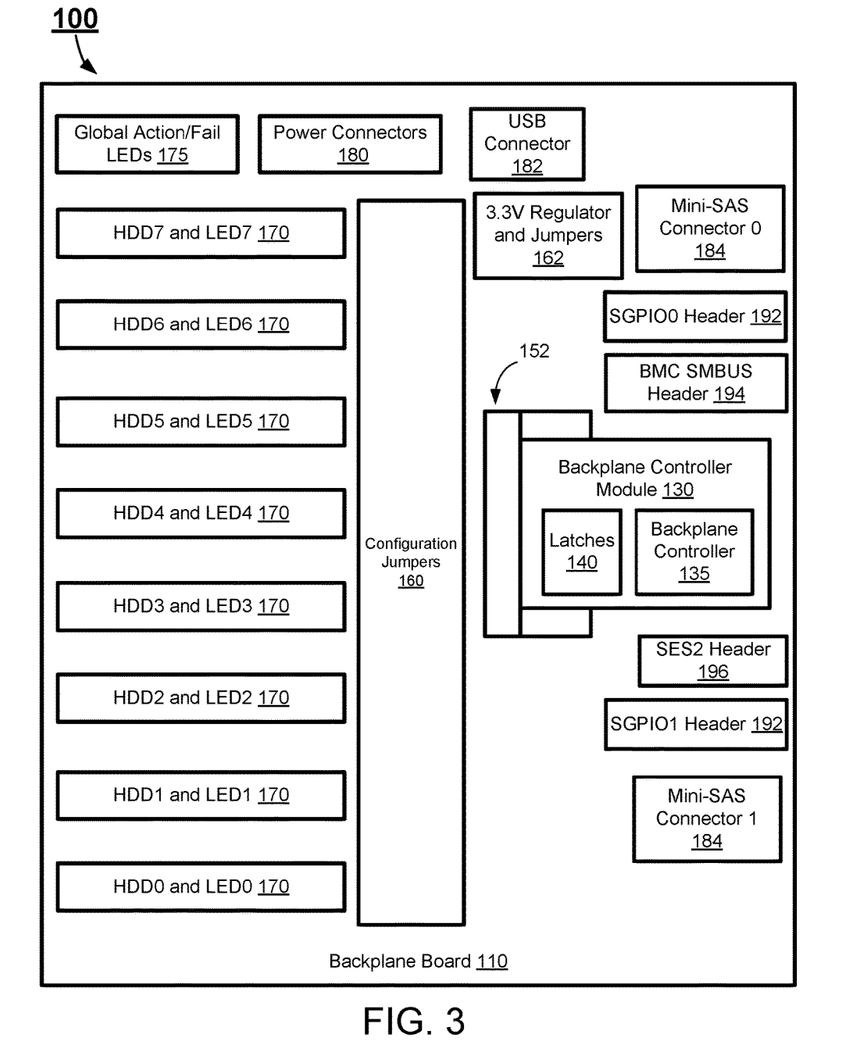
FIG. 3 schematically depicts the backplane board with the backplane controller module mounted thereon according to certain embodiments of the present disclosure.

FIG. 3 schematically depicts the backplane board with the backplane controller module mounted thereon according to certain embodiments of the present disclosure. As shown in FIG. 3, when the SODIMM connector pin set 154 (not shown in FIG. 3) of the backplane controller module 130 is inserted into the SODIMM connector socket 152 of the backplane board 110, the backplane controller module 130 is connected to the backplane board 110, such that the backplane controller 135 may control the components on the backplane board 110.

In summary, as disclosed in the embodiments of the present disclosure, the backplane controller is provided on the backplane controller module in a modular design, allowing the backplane board and the backplane controller module to be connected by the SODIMM connector interface. Since multiple backplane controller modules may be respectively provided to have different backplane controllers with different features and functions, a user of a backplane may change the backplane controller easily by removing the detachable backplane controller module from the backplane board, and install a different backplane controller module on the backplane board in order to obtain the additional features or functions supported by the new backplane controller module. Thus, the backplane board may be used for all backplane controller modules, and there is no need to replace the backplane board of the backplane system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A backplane system, comprising:
    a backplane board; and
    a backplane controller module having a backplane controller, the backplane controller module being configured to be detachably connected to the backplane board via a small outline dual in-line memory module (SODIMM) connector interface to enable communications between the backplane controller and the backplane board via the SODIMM connector interface, such that the backplane controller is configured to control a plurality of components on the backplane board;
    wherein the SODIMM connector interface comprises a SODIMM connector pin set provided on the backplane controller module and a SODIMM connector socket disposed on the backplane board, the SODIMM connector pin set is a 144-pin SODIMM connector having 144 contact pins and is configured to be detachably inserted into the SODIMM connector socket, and the 144 contact pins comprise:
    backplane controller host related pins;
    reset and programming pins;
    configuration and strapping pins; and
    miscellaneous and reserved pins.

2. The backplane system as claimed in claim 1, wherein the SODIMM connector socket is a corresponding 144-pin SODIMM socket.

3. The backplane system as claimed in claim 1, wherein the components on the backplane board comprise a plurality of storage drives, and the 144 contact pins of the SODIMM connector pin set further comprise drive presence and activity detect pins.

4. The backplane system as claimed in claim 1, wherein the components on the backplane board comprise a plurality of light emitting diodes (LEDs), and the 144 contact pins of the SODIMM connector pin set further comprise LED control pins.

5. The backplane system as claimed in claim 1, wherein the components on the backplane board comprise at least one power connector, and the 144 contact pins of the SODIMM connector pin set further comprise power and ground pins.

6. The backplane system as claimed in claim 1, wherein the components on the backplane board comprise at least one universal serial bus (USB) connector, and the 144 contact pins of the SODIMM connector pin set further comprise USB pins.

7. The backplane system as claimed in claim 1, wherein the components on the backplane board comprise at least one latch, and the 144 contact pins of the SODIMM connector pin set further comprise latch pins.

8. The backplane system as claimed in claim 1, wherein the 144 contact pins of the SODIMM connector pin set further comprise baseboard management controller (BMC) or firmware upgrade controller pins.

9. The backplane system as claimed in claim 1, wherein the backplane board is a serial attached SCSI (SAS) or serial AT attachment (SATA) backplane board.

10. A backplane controller module, comprising:
    a backplane controller; and
    a small outline dual in-line memory module (SODIMM) connector pin set, configured to be detachably inserted into a SODIMM connector socket on a backplane board to enable a communication between the backplane controller and the backplane board, such that the backplane controller is configured to control a plurality of components on the backplane board,
    wherein the SODIMM connector pin set is a 144-pin SODIMM connector having 144 contact pins, and the 144 contact pins comprise:
    backplane controller host related pins;
    reset and programming pins;
    configuration and strapping pins; and
    miscellaneous and reserved pins.

11. The backplane controller module as claimed in claim 10, wherein the components on the backplane board comprise:
    a plurality of storage drives;
    a plurality of light emitting diodes (LEDs);
    at least one power connector;
    at least one universal serial bus (USB) connector; and
    at least one latch.

12. The backplane controller module as claimed in claim 11, wherein the 144 contact pins of the SODIMM connector pin set further comprise:
 power and ground pins;
 USB pins;
 LED control pins;
 drive presence and activity detect pins;
 baseboard management controller (BMC) or firmware upgrade controller pins; and
 latch pins.

13. A backplane board of a backplane system, comprising:
 a small outline dual in-line memory module (SODIMM) connector socket disposed on the backplane board, allowing a backplane controller module having a corresponding SODIMM connector pin set to be detachably inserted into the SODIMM connector socket to enable a communication between a backplane controller on the backplane controller module and the backplane board; and
 a plurality of components provided thereon, each configured to be controlled by the backplane controller,
 wherein the corresponding SODIMM connector pin set is a 144-pin SODIMM connector having 144 contact pins, and the 144 contact pins comprise:
 backplane controller host related pins;
 reset and programming pins;
 configuration and strapping pins; and
 miscellaneous and reserved pins.

14. The backplane board as claimed in claim 13, wherein the SODIMM connector socket is a 144-pin SODIMM socket.

15. The backplane board as claimed in claim 14, wherein the components comprise:
 a plurality of storage drives;
 a plurality of light emitting diodes (LEDs);
 at least one power connector;
 at least one universal serial bus (USB) connector; and
 at least one latch.

16. The backplane board as claimed in claim 15, wherein the 144 contact pins of the SODIMM connector pin set comprise:
 power and ground pins;
 USB pins;
 LED control pins;
 drive presence and activity detect pins;
 baseboard management controller (BMC) or firmware upgrade controller pins; and
 latch pins.

17. The backplane board as claimed in claim 13, being a serial attached SCSI (SAS) or serial AT attachment (SATA) backplane board.

* * * * *